United States Patent Office 3,420,842
Patented Jan. 7, 1969

3,420,842
PROCESS FOR THE PREPARATION OF
2-NITROIMIDAZOLES
Giancarlo Lancini, Pavia, and Ettore Lazzari, Milan, Italy, assignors to Lepetit S.p.A., Milan, Italy
No Drawing. Continuation-in-part of application Ser. No. 470,888, July 9, 1965. This application Oct. 14, 1965, Ser. No. 496,184
Claims priority, application Great Britain, Aug. 12, 1964, 32,843/64
U.S. Cl. 260—309       2 Claims
Int. Cl. C07d 49/36

ABSTRACT OF THE DISCLOSURE 2-nitroimidazole (azomycin) and its lower alkyl and poly-lower alkyl derivatives are prepared by diazotizing a 2-aminoimidazole, or its acid addition salt, with an approximately equimolecular amount of an alkali metal nitrite in concentrated fluoboric acid, followed by treatment with a molecular excess of an alkali metal nitrite in water in the presence of copper powder as catalyst. The compounds are active against *Trichomonas vaginalis.*

---

This application is a continuation-in-part of our copending application, Ser. No. 470,888, filed July 9, 1965, now abandoned.

This invention is concerned with a chemical process for preparing antibiotic substances. More particularly, the invention is concerned with the preparation of azomycin and its homologs of the formula

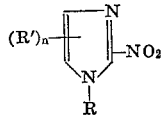

wherein R represents hydrogen or lower alkyl groups of 1–8 carbon atoms, R' represents a lower alkyl group of 1–8 carbon atoms and $n$ is 0–2.

A further purpose of this invention is to provide new azomycin homologs having interesting antiprotozoal properties.

Azomycin is a known antibiotic active against gram positive and gram negative microorganisms, such as for instance *Trichomonas vaginalis*. The biological production of azomycin has been described by several authors, who obtained it by fermentation of different streptomyces species. Due to its comparatively simple chemical structure it is of great interest to provide a chemical process of preparation in order to reduce costs and to avoid the cumbersome and expensive apparatus necessary for carrying out industrial fermentations.

However, in spite of the simple structure, no method has up to the present been described for the chemical synthesis. In fact, the direct nitration of imidazole gives a 4 (or 5) substituted nitroderivative. On the other hand, 2-aminoimidazole was not to be foreseen as a useful intermediate, since its chemical behaviour hints to a 2-imino structure, which is not apt to undergo the common reactions of conversion of amino into nitro groups.

In "Imidazole and Its Derivatives" (Hofmann, Interscience Publishers, 1953), on page 141, there is stated "2-aminoimidazole fails to undergo diazotization when treated with nitrous acid, but is converted into a nitroso derivative."

We have surprisingly found that under particular conditions both 2-nitroimidazole (azomycin) and the above defined alkyl derivatives thereof can be advantageously prepared by diazotizing a 2-aminoimidazole with about an equimolecular amount of an alkali metal nitrite in concentrated fluoboric acid. The mixture is then treated with an excess over an equimolecular amount of an alkali metal nitrite in water in the presence of copper powder as the catalyst. From a practical point of view, it has been found that sodium nitrite gives the best results. The overall amount of the nitrite is not critical, although, as above indicated, the first step of the process, i.e. diazotization, requires that about one equimolecular amount be used. In the second step, amounts corresponding to an additional equimolecular quantity can be operative, although it is better to use at least 2–3, and preferably over seven equimolecular amounts. Also the amount of copper powder is not critical; however, it is preferable to use a weight of catalyst which ranges between 1 and 3 times the weight of the starting 2-aminoimidazole.

The product can be recovered by usual methods, for instance adjusting the mixture to pH about 2 by the addition of hydrochloric acid. The formed 2-nitroimidazole is extracted with an organic solvent in which the product is soluble and the solvent is distilled off. The residue may optionally be recrystallized from an appropriate solvent.

It will be apparent that poly-alkylated 2-nitroimidazoles can be also prepared by other conventional routes starting from less alkylated 2-nitroimidazoles. Thus, for instance, 1,4-dimethyl-2-nitroimidazole can be prepared from 4(5)-methyl-2-nitroimidazole by methylation with methyl iodide or diazomethane. By the same method, 1,4,5-trimethyl-2-nitroimidazole can be obtained starting from 4,5-dimethyl-2-nitroimidazole. However, also when these alternative routes are preferred, it is always necessary to use, as starting compounds, alkylated imidazoles prepared according to the process herein described and claimed. It is thus apparent that also the other routes by which poly-alkylated 2-nitroimidazoles are produced fall within the scope of the present invention.

As above stated, by the herein described process it is possible to prepare azomycin homologs of high interest as antibacterial substances. In this report a particular activity is displayed by the new homologs against *Trichomonas vaginalis*, the minimum inhibitory concentration in vitro ranging between 0.1 and 1 γ/ml. On the other hand, also against experimental infection from *Trichomonas vaginalis* in mice the new nitroimidazoles showed an excellent activity, doses of 10 to 20 mg./kg. being largely sufficient for a complete protection.

The following are examples of the process. However, it is intended that the invention embrace all possible modifications which may be considered as obvious equivalents of the process as above described.

EXAMPLE 1
2-nitroimidazole

A solution of 167 g. of sodium nitrite in 420 ml. of water is slowly added to a solution of 288 g. of 2-aminoimidazole hydrochloride in 1300 ml. of 40% fluoboric acid. The mixture is poured into 5000 ml. of water containing 2500 g. of sodium nitrite and 500 g. of copper powder. After stirring at room temperature for 1 hour the solution is adjusted to pH 2.0 with hydrochloric acid and extracted with ethyl acetate. After evaporation of the solvent the residue is recrystallized from ethanol.

The product has M.P. 284° C. The mixed M.P. with an authentic sample gives no depression.

Analysis for $C_3H_3N_3O_2$.—Calcd.: C, 31.80; H, 2.65; N, 37.17. Found: C, 31.70; H, 2.75; N, 37.17.

EXAMPLE 2
1-methyl-2-nitroimidazole

Seven grams of 1-methyl-2-aminoimidazole are diazotized with 3.6 g. of sodium nitrite in 40 ml. of fluoboric acid and the resulting solution is treated as described above with 53.5 g. of sodium nitrite and 10 g. of copper powder. Evaporation of the ethyl acetate extract gives a light yellow product melting at 100.5–102° C.

Analysis for $C_4H_5N_3O_2$.—Calcd.: C, 37.97; H, 3.97; N, 33.06. Found: C, 37.90; H, 3.95; N, 32.90.

EXAMPLE 3

4,5-dimethyl-2-nitroimidazole

An amount of 4.75 g. of 4,5-dimethyl-2-aminoimidazole hydrochloride is dissolved in 50 ml. of water and 18.4 ml. of fluoboric acid (62.4%) and diazotized with 2.22 g. of sodium nitrite in 15 ml. of water.

The diazotized solution is poured into 300 ml. of water containing 4.5 g. of copper powder and 17.76 g. of sodium nitrite. After stirring at room temperature for some hours the solution is adjusted to pH 2.0 with hydrochloric acid and then extracted with ethyl acetate. After evaporation of the solvent the residue is recrystallized from ethyl ether.

The product darkens at 206° C. and melts at 217°–218° C.

Analysis for $C_5H_7N_3O_2$.—Calcd.: C, 42.53; H, 4.96; N, 29.8. Found: C, 42.30; H, 5.06; N, 29.75.

EXAMPLE 4

4(5)-methyl-2-nitroimidazole

A solution of 7.59 g. of sodium nitrite in 50 ml. of water is dropwise added to a solution of 13.36 g. of 4(5)-methyl-2-aminoimidazole hydrochloride in 50 ml. of water and 55 ml. of fluoboric acid (62%). The diazotized solution is poured into 1500 ml. of water containing 55 g. of sodium nitrite and 15 g. of copper powder. After stirring at room temperature for some hours the solution is adjusted to pH 2.0 with hydrochloric acid and extracted with ethyl acetate. By evaporation of the solvent a white-yellow powder is obtained which after recrystallization from ethyl acetate melts at 204°–206° C.

Analysis for $C_4H_5N_3O_2$.—Calcd.: C, 37.8; H, 3.97; N, 33.06. Found: C, 37.85; H, 4.00; N, 33.15.

EXAMPLE 5

1,5-dimethyl-2-nitroimidazole

To a solution of 15.3 g. of 1,5-dimethyl-2-aminoimidazole hydrochloride in 180 ml. of 20% $HBF_4$ a solution of 7.5 g. of $NaNO_2$ in 70 ml. of water is gradually added at 0° C. The obtained solution is poured into a mixture of 57.2 g. of $NaNO_2$, 20 g. of powdered Cu and 2 litres of water. After 15 hours at room temperature dilute HCl is added to acidic reaction and the mixture is extracted with ethyl acetate. After evaporation of the solvent the residue is recrystallized from ethyl ether. The product melts at 107–108° C. (dec.).

The starting compound, i.e. 1,5-dimethyl-2-aminoimidazole, is prepared as follows:

A solution of 6 g. of cyanamid and 6.4 g. of α-methylaminopropionaldehyde in 18 ml. of aqueous 10% acetic acid is heated for 1 hour on a boiling water bath. The solution is cooled, filtered and evaporated to dryness. By fractional crystallization from acetone 1-methyl-1-[2-(1-diethoxy)-propyl]-guanidine acetate is obtained. The reaction is represented as follows:

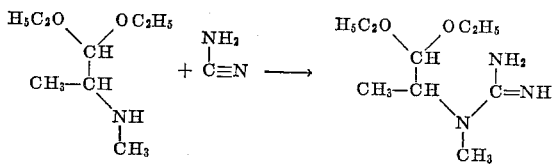

The compound has M.P. 158–160° C.

The above intermediate (4.3 g.) is heated at 100° C. for 10 minutes in 13 ml. of conc. HCl. After dilution with 15 ml. of water the solution is evaporated to dryness and the residue is recrystallized from ethanol. The obtained 1,5-dimethyl-2-aminoimidazole has M.P. 255–257° C. (dec.).

EXAMPLE 6

1,4,5-trimethyl-2-nitroimidazole

Prepared from 1,4,5-trimethyl-2-aminoimidazole, substantially as described in the above examples. M.P. 178–179° C.

We claim:

1. A process for preparing a 2-nitroimidazole of the formula

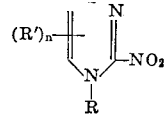

wherein R is a member of the class consisting of hydrogen and lower alkyl groups of 1–8 carbon atoms, R' is a member of the class consisting of lower alkyl groups of 1–8 carbon atoms, $n$ is an integer from 0 to 2, which comprises contacting a 2-aminoimidazole of the formula

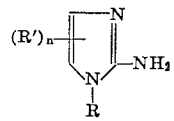

with about an equimolecular amount of an alkali metal nitrite in concentrated fluoboric acid and treating the resulting solution with an excess over an equimolecular amount of an alkali metal nitrite in water in the presence of copper powder as the catalyst.

2. A process for preparing the antibiotic azomycin, which comprises contacting 2-aminoimidazole with about an equimolecular amount of sodium nitrite in concentrated fluoboric acid and treating the resulting soluttion with an excess over an equimolecular amount of an alkali metal nitrite in water in the presence of copper powder as the catalyst.

References Cited

UNITED STATES PATENTS 3,065,133   11/1962   Tchelitcheff _____ 260—309
3,287,468   11/1966   Beaman et al. _____ 260—309

FOREIGN PATENTS 837,838   6/1960   Great Britain.

OTHER REFERENCES

Blatt Organic Synthesis Collective vol. 2, pp. 225–7 N.Y. Wiley, 1943 QD 262.072.

Gallo et al. Jour. Org. Chem. vol. 29, pp. 862–5 (April 1964). QD 241. J6.

Hodgson et al. Jour. Soc. Dyers and Colourists vol. 66, pp. 229–31 (1950) TP 890.S6.

Nakamura Chem. Abst. vol. 50, col. 15897–8 (1956) QD1.A51.

Noller Chemistry of Organic Compounds, 2nd ed. pp. 492–5 Philadelphia, Saunders, 1957, QD253.N65.

Wagner et al. Synthetic Organic Chemistry, pp. 749 and 772–73. N.Y., Wiley, 1953, OD262.W24.

HENRY R. JILES, Primary Examiner.

NATALIE TROUSOF, Assistant Examiner.

U.S. Cl. X.R.

260—141, 564; 424—273